US008064385B2

(12) United States Patent
Kumazawa et al.

(10) Patent No.: US 8,064,385 B2
(45) Date of Patent: Nov. 22, 2011

(54) PATH CONTROL METHOD AND HOME AGENT

(75) Inventors: Masayuki Kumazawa, Kanagawa (JP); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1056 days.

(21) Appl. No.: 11/909,865

(22) PCT Filed: Mar. 28, 2006

(86) PCT No.: PCT/JP2006/306250
§ 371 (c)(1),
(2), (4) Date: Sep. 27, 2007

(87) PCT Pub. No.: WO2006/106658
PCT Pub. Date: Oct. 12, 2006

(65) Prior Publication Data
US 2009/0201848 A1    Aug. 13, 2009

(30) Foreign Application Priority Data

Mar. 30, 2005    (JP) ................................ 2005-097424

(51) Int. Cl.
*H04W 4/00* (2009.01)
(52) U.S. Cl. ........................................ 370/328; 370/338
(58) Field of Classification Search .................. 370/328, 370/338, 401; 455/433; 709/238
See application file for complete search history.

(56) References Cited

U.S. PATENT DOCUMENTS

| | | | | |
|---|---|---|---|---|
| 7,136,365 | B2 * | 11/2006 | Nakatsugawa et al. | 370/331 |
| 7,609,687 | B2 * | 10/2009 | Kobayashi et al. | 370/356 |
| 2004/0093426 | A1 * | 5/2004 | Sahasrabudhe et al. | 709/238 |
| 2006/0062191 | A1 * | 3/2006 | Matsumoto | 370/338 |

FOREIGN PATENT DOCUMENTS

| | | |
|---|---|---|
| JP | 2003-283546 A | 10/2003 |
| JP | 2004-120322 A | 4/2004 |
| JP | 2004-274733 A | 9/2004 |
| JP | 2005-051757 A | 2/2005 |
| JP | 2005-072685 A | 3/2005 |
| JP | 2005-203938 A | 7/2005 |

OTHER PUBLICATIONS

V. Devarapalli et al."Network Mobility (NEMO) Basic Support Protocol", Network Working Ggroup Request for Comments: 3963, The Interenet Society (2005).*
International Search Report for Application No. PCT/JP2006/306250 dated Mar. 28, 2006.
Devarapalli et al., "Network Mobility (NEMO) Basic Support Protocol," Network Working Group, pp. 1-33.
Malkin et al., "RIPng for IPv6," Network Working Group, pp. 1-19.
Tsukada, et al., "Dynamic Management of Multiple Mobile Routers," 2005 13th IEEE International Conference on Networks (Nov. 16-18, 2005).

* cited by examiner

*Primary Examiner* — Ricky Ngo
*Assistant Examiner* — David Oveissi
(74) *Attorney, Agent, or Firm* — RatnerPrestia (57) ABSTRACT

In a mobile network system composed of a mobile network with a mobile router and a terminal interconnected, and of a home agent, when the mobile router connects to an external network, the mobile router informs the home agent of path information to the mobile network including the mobile router. Receiving the path information, the home agent inquires the mobile router in the home network whether or not the mobile router connects to the mobile network informed. Then, the home agent advertises path information to this mobile network only when the mobile router connecting to the mobile network does not exist. Accordingly, the home agent can rapidly switch to an optimum path to the external network.

2 Claims, 10 Drawing Sheets

| HoA | CoA | Interface |
|---|---|---|
| HoA_MR4 | CoA_MR4 | tunnel_1 |
| HoA_MR5 | CoA_MR5 | tunnel_2 |

| Destination | Next hop | Metric | Interface |
|---|---|---|---|
| MNP3 | : : | 1 | tunnel_1 |
| MNP3 | MR5 | 2 | if_home |

| Destination | Next hop | Metric | Interface |
|---|---|---|---|
| MNP3 | : : | 1 | tunnel_1 |
| MNP3 | : : | 1 | tunnel_2 |

| Destination (2501) | Next hop (2502) | Metric (2503) | Interface (2504) |
|---|---|---|---|
| MNP3 | MR5 | 2 | if_hgw_0 |
|  |  |  |  |

FIG. 7B

| Destination (2501) | Next hop (2502) | Metric (2503) | Interface (2504) |
|---|---|---|---|
| MNP3 | MR5 | 2 | if_hgw_0 |
| MNP3 | HA10 | 1 | if_hgw_0 |

FIG. 7C

| Destination (2501) | Next hop (2502) | Metric (2503) | Interface (2504) |
|---|---|---|---|
| MNP3 | MR5 | 2 | if_hgw_0 |
| MNP3 | HA10 | 16 | if_hgw_0 |

PATH CONTROL METHOD AND HOME AGENT

This application is a U.S. National Phase Application of PCT International Application PCT/JP2006/306250.

TECHNICAL FIELD

The present invention relates to a path control method and to a home agent in a mobile network system composed of a mobile network with a mobile router and a terminal interconnected and of a home agent that manages the address of the mobile network.

BACKGROUND ART

Conventionally, a technique for providing mobile communication of the entire network composed of a movable terminal group and a router has been examined in IETF NEMO-WG.

NEMO (Network Mobility) described in the document *Network Mobility (NEMO) Basic Support Protocol* (written by Vijay Devarapalli et al., RFC3963) is a technique that implements data communication in a network (referred to as "mobile network" hereinafter) composed of a movable terminal group, and of a mobile router connecting to an external network such as the Internet, by means of the mobile network and a home agent that manages the position of the mobile network.

Figure 10:
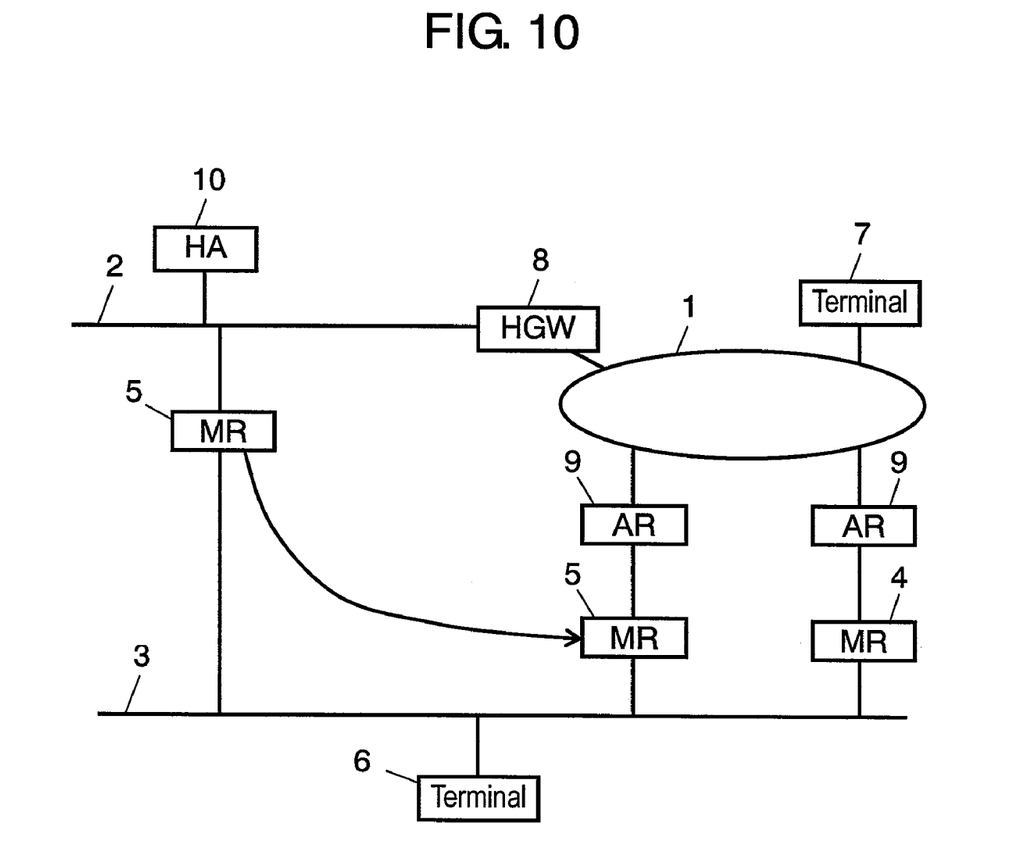
FIG. 10 is a block diagram of a conventional mobile network system.

FIG. 10 illustrates a conventional mobile network system disclosed in the document.

In FIG. 10, terminal 6 connects to mobile network 3 managed by mobile router (MR) 5 and mobile router (MR) 4. Mobile router 5 connects to home network 2 managed by home agent (HA) 10 and to global network 1 such as the Internet through home gateway (HGW) 8. Mobile router (MR) 4 connects to global network 1 through access router (AR) 9.

Figure 11:
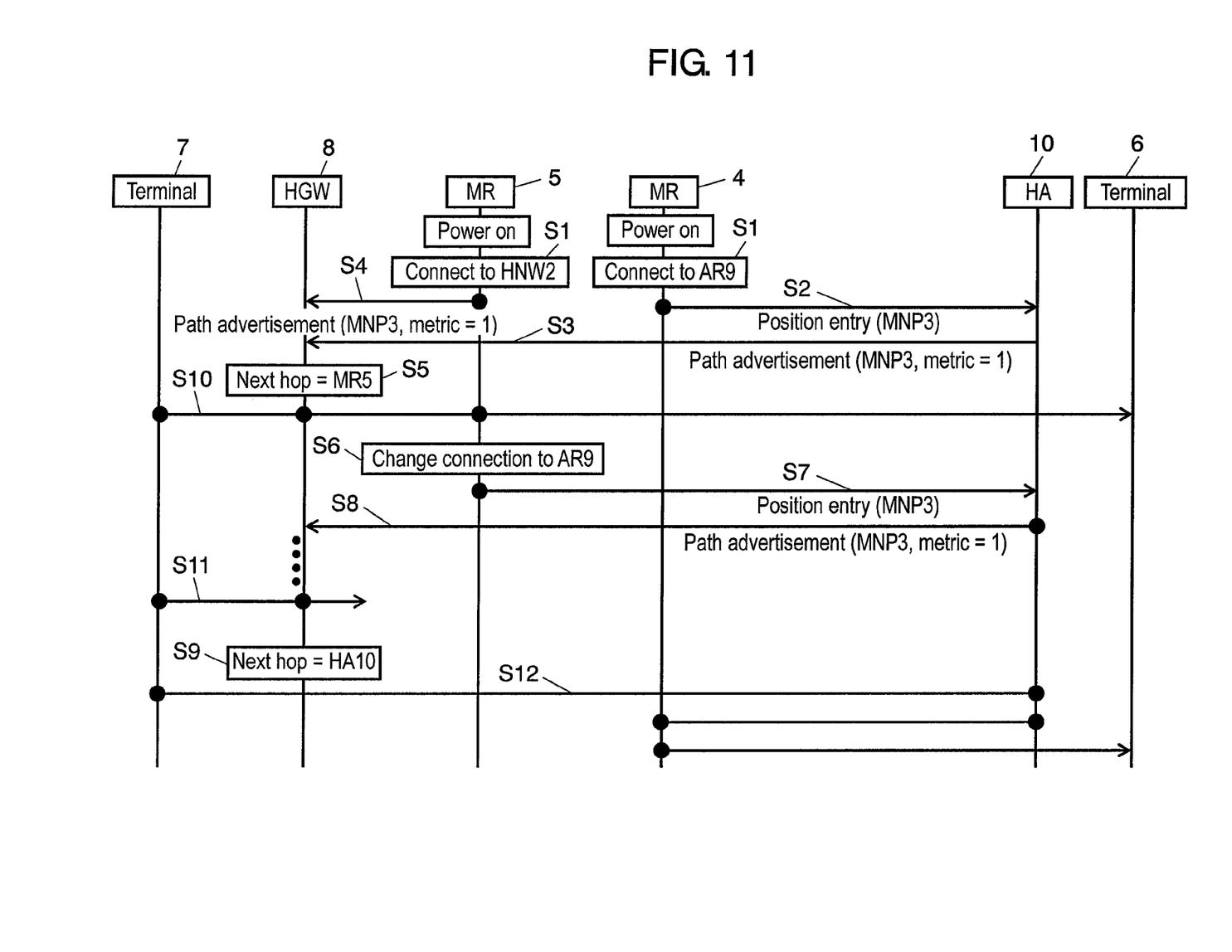
FIG. 11 illustrates a conventional path control sequence.

A description is made for path control in such a mobile network system using FIG. 11.

FIG. 11 is a sequence diagram illustrating path control in a conventional mobile network system.

In FIG. 11, when the power to mobile router 4, 5 turns on, mobile router 4 connects to access router (AR) 9, and mobile router 5 connects to home network (HNW) 2 (step S1).

It is assumed that mobile router 4 is a mobile phone, and mobile router 5 is a PDA having a wireless LAN interface, for example. In this case, mobile phone (MR4) connects to a base station (AR9) placed out of home even if the user is at home, not directly connecting to home network 2 at home. The PDA (MR5) connects to home network 2 through a wireless LAN interface.

In this way, some mobile routers results in connecting to home network 2, and the others not connecting even in the same home.

That is, mobile router 4 creates a care-of address (referred to as "CoA" hereinafter) to perform position entry in home agent 10 (step S2) in order to connect to an external network other than home network 2. Mobile router 4 informs home agent 10 of the network prefix (referred to as "MNP3" hereinafter) of network 3 simultaneously with the position entry.

Having acquired a path addressed to MNP3 via mobile router 4, home agent 10 starts path advertisement for informing the acquisition (step S3). Mobile router 5 as well has a path addressed to MNP3, and thus advertises the path addressed to MNP3 to home network 2 (step S4). The information on the path addressed to MNP3 advertised by this mobile router 5 is assumed to be metric=1. The metric generally indicates the number of hops to a destination, where a path with a smaller metric is selected more preferentially.

The above information enables home gateway 8 to learn a relay destination to which a packet addressed to MNP3 is to be transferred.

Here, home gateway 8 determines a next hop as a path addressed to MNP3 to be mobile router 5 (step S5). Accordingly, home gateway 8 transmits data addressed to terminal 6 to mobile router 5 (step S10).

Next, when the user moves to a location with an access point for a wireless LAN after going out of home carrying a PDA (MR5), the PDA (MR5) connects to access router 9 for the wireless LAN (step S6). Then, the PDA (MR5) creates a CoA to perform position entry in home agent 10 (step S7).

Receiving a notice from mobile router 5, home agent 10 periodically advertises path information same as that advertised in step S3, to the home network (step S8). However, a packet for advertising a path is generally sent out at time intervals of several tens of seconds to prevent the communication traffic load from increasing. Accordingly, home gateway 8 tries transmitting a packet with mobile router 5 as a relay destination even if home gateway 8 ceases receiving a path advertising packet from mobile router 5 (step s11).

After that, home gateway 8 updates the path table on the basis of path information from home agent 10 and selects home agent 10 as a new relay destination to MNP3 (step S9). Consequently, data destined for terminal 6 is delivered through mobile router 4 via home agent 10 (step S12).

In this way, the user can communicates with a terminal and the like on the Internet from terminal 6 by connecting to the home network through mobile router 5 while at home, and via a mobile phone (MR4) outdoors.

However, in step S5, if home gateway 8 receives a path advertisement packet from home agent 10 (step S3) earlier than that from mobile router 5 (step S4), home gateway 8 results in selecting home agent 10 as a relay destination for a packet addressed to MNP3 because both metrics are '1'.

In this case, a packet from terminal 7 addressed to terminal 6 is more efficiently sent from home gateway 8 to terminal 6 via mobile router 5 because a packet merely flows through the home network. However, home gateway 8 results in selecting a redundant path that passes through home agent 10 and mobile router 4.

In step S6, when the user leaves home and his/her carrying PDA (mobile router 5) connects to access router 9, home gateway 8 does not updates a path table for several tens of seconds even if home agent 10 is newly advertising a path. Accordingly, a packet addressed to terminal 6 during this period does not reach terminal 6 but disappears.

SUMMARY OF THE INVENTION

An object of the present invention is to provide a path control method where, when at least one mobile router in a mobile network is connected to a home link, communication between a terminal in the mobile network and an external network is performed through the mobile router; and when no mobile routers are connected to the home link, the communication is performed through a mobile router connected to the external network, and to provide a home agent for implementing the method.

The path control method of the present invention is that in a mobile network system composed of a mobile network with a mobile router and a terminal interconnected and of a home agent that manages the address of the mobile network. That is, when the mobile router connects to an external network other than the home network including the mobile router, the mobile router informs path information on its own mobile network of the home agent. When the home agent acquires path information addressed to the mobile network, the home agent inquires of the home network whether or not another mobile router connecting to the mobile network exists. After that, the home agent advertises the path information addressed to the mobile network only when the home agent judges that the mobile router connecting to the mobile network does not exist in the home network.

Accordingly, a packet addressed to the mobile network is transmitted by being relayed by the mobile router if the mobile router connecting to the mobile network exists, which means the packet is delivered to a destination through the shortest path.

The path control method of the present invention further performs the following process. That is, when a mobile router connects to a home network, the mobile router requests the home agent to update the position entry and then advertises path information to the mobile network including the mobile router, to the home network. Then the home agent advertises to within the home network that a packet cannot be transferred to the mobile network if the request for updating the position entry is one that will delete the position entry of the mobile router.

Accordingly, each node in the home network learns that the connection between the mobile router and external network has become impossible when the mobile router returns to the home network. Accordingly, the home agent can perform a process for switching to a path passing through another mobile router.

A home agent of the present invention is equipped with a receiving unit, a mobile router presence acknowledging unit, and an alternate path information advertising unit. The receiving unit receives a request for position entry from a mobile router connected to a mobile network. The mobile router presence acknowledging unit transmits a path inquiry message that inquires whether or not another mobile router connected to the mobile network exists in the home network. When acknowledging that no other mobile routers connected to the mobile network exist in the home network, through the path inquiry message, the alternate path information advertising unit advertises to the home network, alternate path information indicating that the home agent itself has an alternate path addressed to the mobile network, with the lowest cost.

This process allows the home gateway to promptly switch to a path passing through the home agent when all the mobile routers connecting to the mobile network leave the home network.

The home agent of the present invention further has an alternate path deleting unit, which advertises to the home network, alternate path information indicating that the alternate path involves the maximum cost, when the receiving unit receives a request for deleting the position entry from the mobile router.

This process allows the home gateway to promptly switch from a path passing through a home agent to that passing through the mobile router when the mobile router returned to the home network.

The alternate path information advertising unit of the home agent of the present invention does not advertise information on the path to the mobile network if the mobile router connected to the mobile network exists in the home network.

Accordingly, the mobile router connected to the mobile network existing in the home network is used as a relay path to the mobile network if the mobile router connected to the mobile network exists in the home network.

As described above, the present invention enables a home gateway to select a mobile router with the shortest path in a case where plural mobile routers exist in one mobile network, and where some mobile routers are connected to a home network; the others, to an external network. Even if the mobile router moves between the home network and the external network, the home gateway can switch in a short time to an optimum path from a path via the home agent or that via the mobile router connected to the home network.

REFERENCE MARKS IN THE DRAWINGS

1 Global network
2 Home network
3 Mobile network
4, 5 Mobile router
6, 7 Terminal
8 Home gateway
9 Access router
10 Home agent
1001 Home network interface
1002 Packet sending and receiving/relay processing unit
1003 Position information management unit
1004 Path information management unit
1005 Position information storing unit
1006 Path information storing unit
1007 Mobile router presence acknowledging unit
1008 Alternate path information advertising unit
1009 Alternate path deleting unit

DETAILED DESCRIPTION OF PREFERRED EMBODIMENT

Hereinafter, a description is made for an embodiment of the present invention with reference to the related drawings.

The configuration of a mobile network system according to the embodiment is the same as that of the conventional one shown in FIG. 10, and thus the same reference marks are used for the description. However, home agent 10 is different from the conventional one in configuration and operation.

Figure 1:
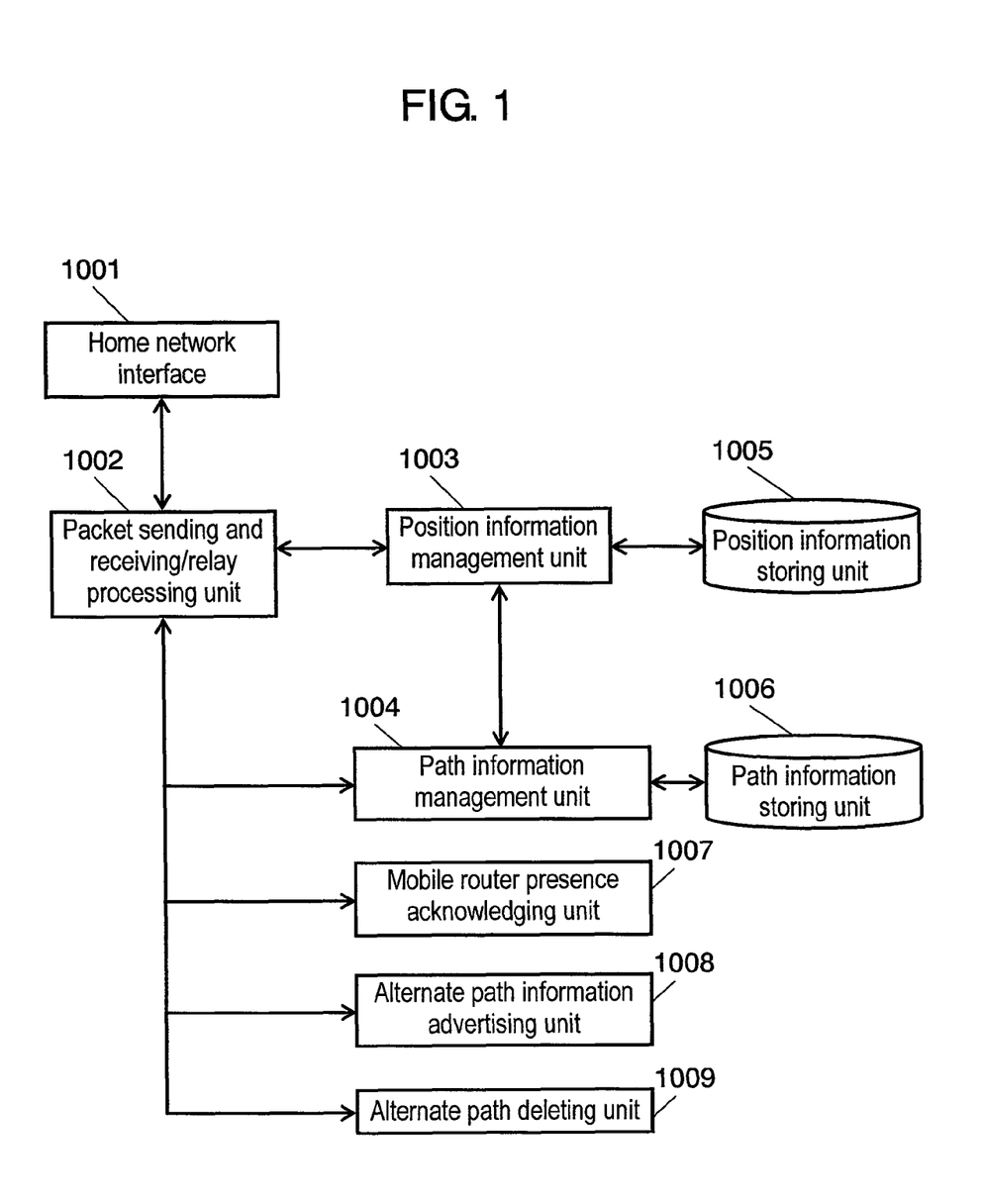
FIG. 1 is a block diagram of a mobile router according to the embodiment of the present invention.

FIG. 1 is a block diagram illustrating the makeup of home agent 10 according to the embodiment.

In FIG. 1, home network interface (referred to as "if_home" hereinafter) 1001 connects to home network 2 to perform a physical layer process and a data link layer process, and packet sending and receiving/relay processing unit 1002 sends and receives a packet and relays a packet to mobile network 3. Home network interface 1001 and unit 1002 correspond to a receiving unit according to the present invention.

Position information management unit 1003 records information on the position of a mobile router, described in a position entry packet and a position entry deleting packet, in position information storing unit 1005 to manage the information.

Figure 4:
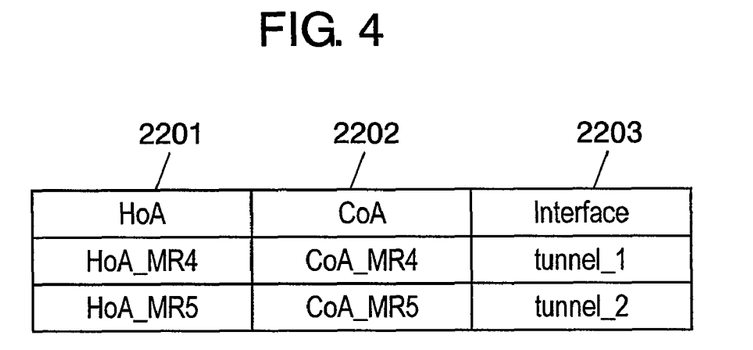
FIG. 4 shows position information managed by a home agent according to the embodiment of the present invention.

FIG. 4 shows a data table of position information to be stored in position information storing unit 1005. In FIG. 4, HoA 2201 is the home address of a mobile router; CoA 2202, the current care-of address of a mobile router, and interface 2203 indicates the communication interface of home agent 10. The communication interface has a tunnel interface, a logical interface, to be registered therein. A tunnel interface is used when a packet received by home agent 10 is encapsulated, a tunnel is formed with a given router, and the packet is tunneled. An interface through which a packet is actually sent and received is a home network interface, a physical interface.

Figure 5A:
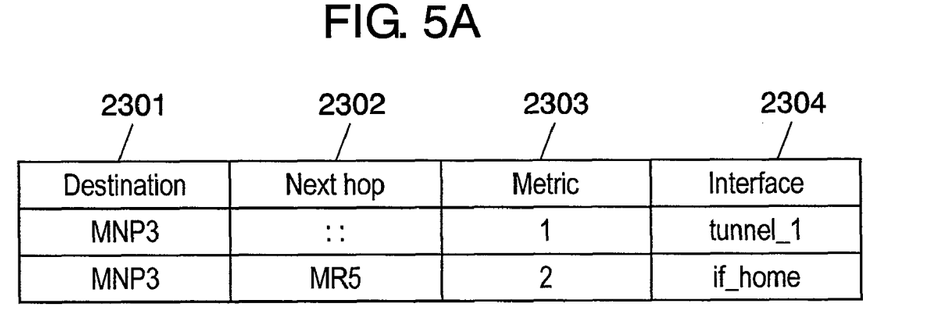
FIG. 5A shows path information managed by a home agent according to the embodiment of the present invention.
Figure 5B:
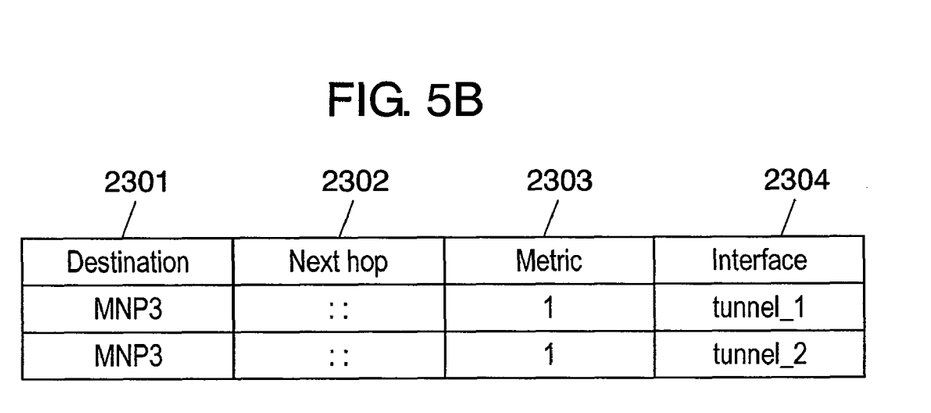
FIG. 5B shows path information managed by a home agent according to the embodiment of the present invention.

Path information management unit 1004 records path information of mobile network 3 in path information storing unit 1006 to manage the information. FIG. 5A shows a data table of path information stored in path information storing unit 1006.

In FIG. 5A, destination 2301 indicates the network prefix of a network where a destination node is positioned; next hop 2302, the router as a next hop in the path to the destination node. Metric 2303 indicates the priority of a path, where a smaller one indicates a higher priority. Interface 2304 indicates an identifier for specifying an interface held by home agent 10.

Mobile router presence acknowledging unit 1007 transmits a path inquiry message for inquiring whether or not a router connected to specified mobile network 3 exists in home network 2.

Alternate path information advertising unit 1008 generates a path advertising packet for informing a node in home network 2 that home agent 10 itself performs substitute reception for relaying a packet to specified mobile network 3 and transmits the path advertising packet.

Alternate path deleting unit 1009 generates a path advertising packet for informing a node in home network 2 that relaying to relevant mobile network 3 is not available because specified mobile network 3 is disconnected, and transmits the path advertising packet.

Next, a description is made for the operation and effects of home agent 10 with the above-described makeup, of the present invention, using the related drawings.

Figure 2:
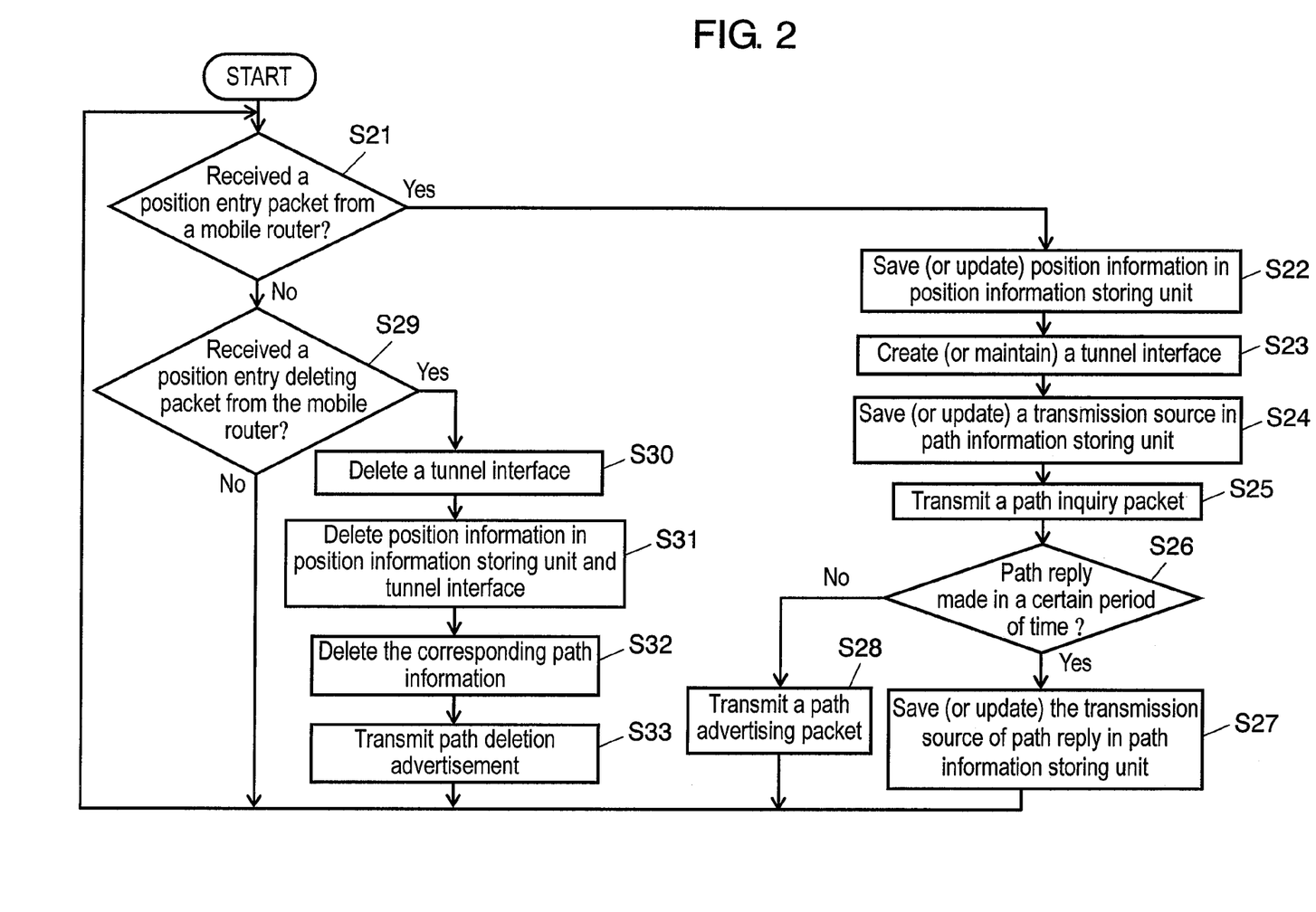
FIG. 2 is a flowchart illustrating the process for position entry/position entry deletion by a home agent according to the embodiment of the present invention.

FIG. 2 is a flowchart illustrating the process of position entry and position entry deletion.

First, when packet sending and receiving/relay processing unit 1002 receives a position entry packet from a mobile router (step S21), unit 1002 informs position information management unit 1003, which then records the position information in position information storing unit 1005 (step S22). The position entry packet is a Binding Update packet in NEMO, and its format is shown in FIG. 8.

Figure 8:
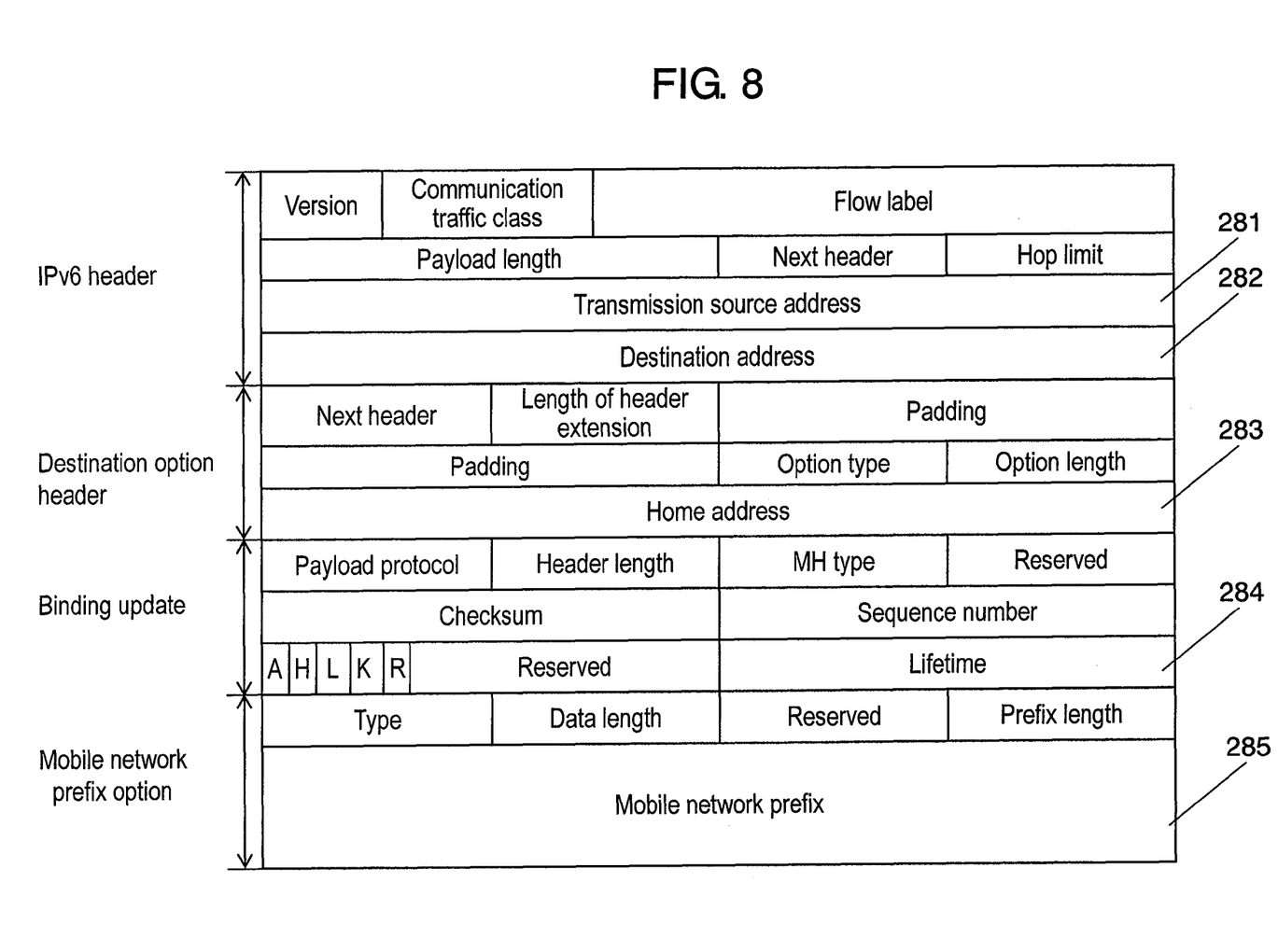
FIG. 8 is a format diagram of a packet for position entry/position entry deletion in a mobile network according to the embodiment of the present invention.

In FIG. 8, the CoA of a mobile router as a transmission source, the address of an home agent, and the HoA of the mobile router are set to transmission source address 281, destination address 282, and home address 283 of the IPv6 header, respectively. The prefix of a mobile network is set to mobile network prefix 285.

Position information management unit 1003 saves (or updates) home address 283 and transmission source address 281 of a mobile router, described in a position entry packet informed, to HoA 2201 and CoA 2202 in position information storing unit 1005, respectively (step S22).

Next, position information management unit 1003 creates or maintains a tunnel interface with the mobile router to register the tunnel number in interface 2203 of position information storing unit 1005 (step S23).

Next, position information management unit 1003 informs path information management unit 1004 of the tunnel number registered. Responding to this information, path information management unit 1004 saves (or updates) the transmission source of the position entry packet in path information storing unit 1006 (step S24).

Next, path information management unit 1004 directs mobile router presence acknowledging unit 1007 to transmit a path inquiry packet to home network 2. Responding to the direction, unit 1007 multicasts to all the RIPng routers in home network 2 (step S25). The path inquiry packet is a RIPng (Routing Information Protocol next generation) packet defined in RFC 2080, and its format is shown in FIG. 9.

Figure 9:
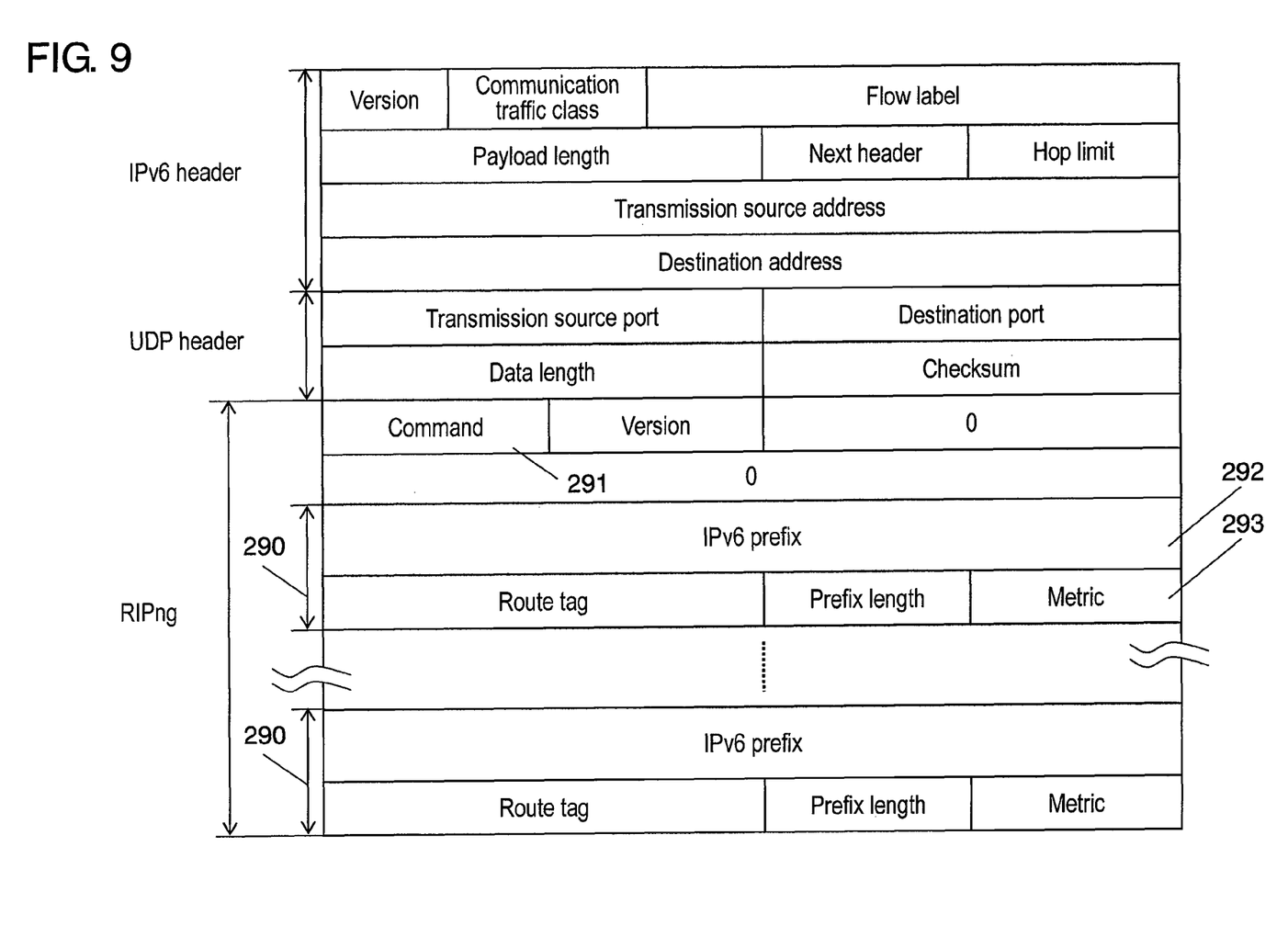
FIG. 9 is a format diagram of a packet for path inquiry/path reply/path advertisement in a mobile network according to the embodiment of the present invention.

In FIG. 9, the RIPng packet stores plural pieces of path information as Routing Table Entry (RTE) 290, respectively. Command 291 includes 1: inquiry for path information (request), 2: reply to a request for path information, and path deletion advertisement (response). IPv6 prefix 292 includes a destination prefix, and metric 293 has a value indicating the priority in path control to be set. In this embodiment, the priority in path control is determined by the cost of the path, where the lowest cost sets the highest priority '1'; the highest cost, the lowest priority '16'. Further, routing table entry 290 includes path information, and reply to a path inquiry is made, or path information is advertised as a path advertising packet in the home network.

Next, mobile router presence acknowledging unit 1007 judges whether or not a reply to the path inquiry has been made in a certain period of time (step S26), and if made, saves (or updates) the transmission source of the path reply packet in next hop 2302 of the path information stored in path information storing unit 1006 (step S27). However, if an entry for a mobile router in home network 2, with a path to the same prefix already exists, unit 1007 deletes the entry and saves all the information on a mobile router as the transmission source that has made a reply. This process prevents an entry for a mobile router that has replied to a path inquiry by the previous time from remaining in spite of being invalid.

In step S26, if a reply to a path inquiry has not been made, alternate path information advertising unit 1008 generates a path advertising packet (metric=1) shown in FIG. 9, in order to inform that the home agent itself performs substitute reception and relays a packet addressed to terminal 6, and transmits the path advertising packet (step S28). In this case, however, if a path with a mobile router in home network 2 as a relay destination remains in path information storing unit 1006, unit 1008 deletes the path. The reason for this process is the same as that in the case where a reply to a path inquiry has been made.

Meanwhile, packet sending and receiving/relay processing unit 1002 receives a position entry deleting packet from the mobile router (step S29). Next, position information management unit 1003 extracts information on the tunnel interface with a mobile router as a transmission source, from position information saved in position information storing unit 1005. Then, position information management unit 1003 deletes the tunnel interface specified on the basis of this information (step S30). Meanwhile, position information management unit 1003 deletes position information (2201 through 2203) on relevant mobile routers in position information storing unit 1005 (step S31). Here, this position entry deleting packet is a Binding Update packet shown in FIG. 8, indicating that the Binding Update packet requests for deleting a position entry by setting zero to lifetime 284. If zero is set to lifetime 284, an HoA is set to transmission source address 281.

Next, position information management unit 1003 informs path information management unit 1004 of information on the tunnel interface deleted, and also directs unit 1004 to transmit path deletion advertisement. Responding to the process, path information management unit 1004 deletes an entry having a corresponding tunnel interface from path information storing unit 1006 (step S32), and directs alternate path deleting unit 1009 to transmit a path deletion advertising packet (step S33).

This path deletion advertising packet, also a RIPng packet shown in FIG. 9, sets '2' indicating path deletion advertisement to command 291, and sets the network prefix of a transmission source of the position entry deleting packet to IPv6 prefix 292. The maximum value '16' is set to metric 293.

In this embodiment, a path inquiry packet is transmitted (step S25) only when a position entry request packet arrives from a mobile router. However, transmission may be made periodically, which allows switching to a path via a home agent if a mobile router connected to home network 2 becomes unavailable due to such as battery exhaustion.

Next, a description is made for a path advertisement process periodically performed by home agent 10 of the present invention, using the related drawings.

Figure 3:
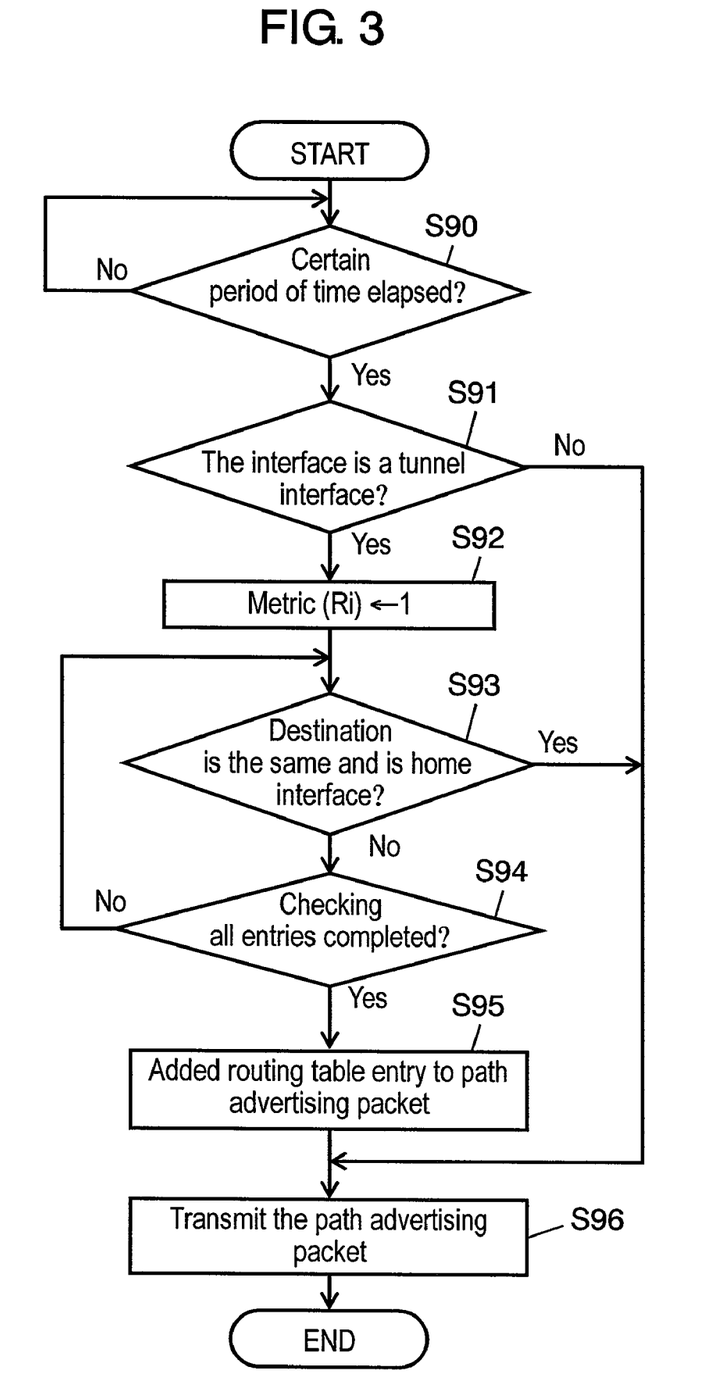
FIG. 3 is a flowchart illustrating the process for advertising a path, by a home agent according to the embodiment of the present invention.

FIG. 3 is a flowchart illustrating the path advertisement process according to the embodiment.

First, path information management unit 1004 judges at certain time intervals (step S90) whether or not the interface of each entry in path information storing unit 1006 is a tunnel interface (step S91). If a tunnel interface, path information management unit 1004 sets '1', the highest priority, to metric 2303 of a corresponding entry (step S92). Then, unit 1004 checks for an entry with its interface being a home network interface (if_home), with the same destination field, for all the entries in unit 1006 (steps S93, S94). If such an entry exists, no process is performed.

Meanwhile, if such an entry does not exist, path information management unit 1004 sets destination 2301 of an entry with a tunnel interface to IPv6 prefix 292, and adds routing table entry 290 created by setting the value of metric 2303 to metric 293, to the path advertising packet (step S95).

In step S91, meanwhile, if a path to the same destination is a home network interface, path information management unit 1004 does not add the entry to the path advertising packet.

After performing the above-described process for all the entries in path information storing unit 1006, path information management unit 1004 directs packet sending and receiving/relay processing unit 1002 to perform multicast transmission of the path advertisement packet generated. Responding to this direction, packet sending and receiving/relay processing unit 1002 multicasts the path advertising packet to all the RIPng routers in home network 2 through home network interface 1001 (step S96).

In this way, home agent 10 of the present invention does not perform path advertisement for a mobile network including a mobile router connected to home network 2, but periodically performs path advertisement only for information on a path to mobile network 3 without a mobile router connected to home network 2, which means home agent 10 performs path advertisement only when relaying.

Next, as shown in FIG. 10, a description is made for the operation of communication between terminal 6 and terminal 7 in a case where mobile router (MR) 5 moves back and forth between home network 2 and external network 1, using the related drawings.

Figure 6:
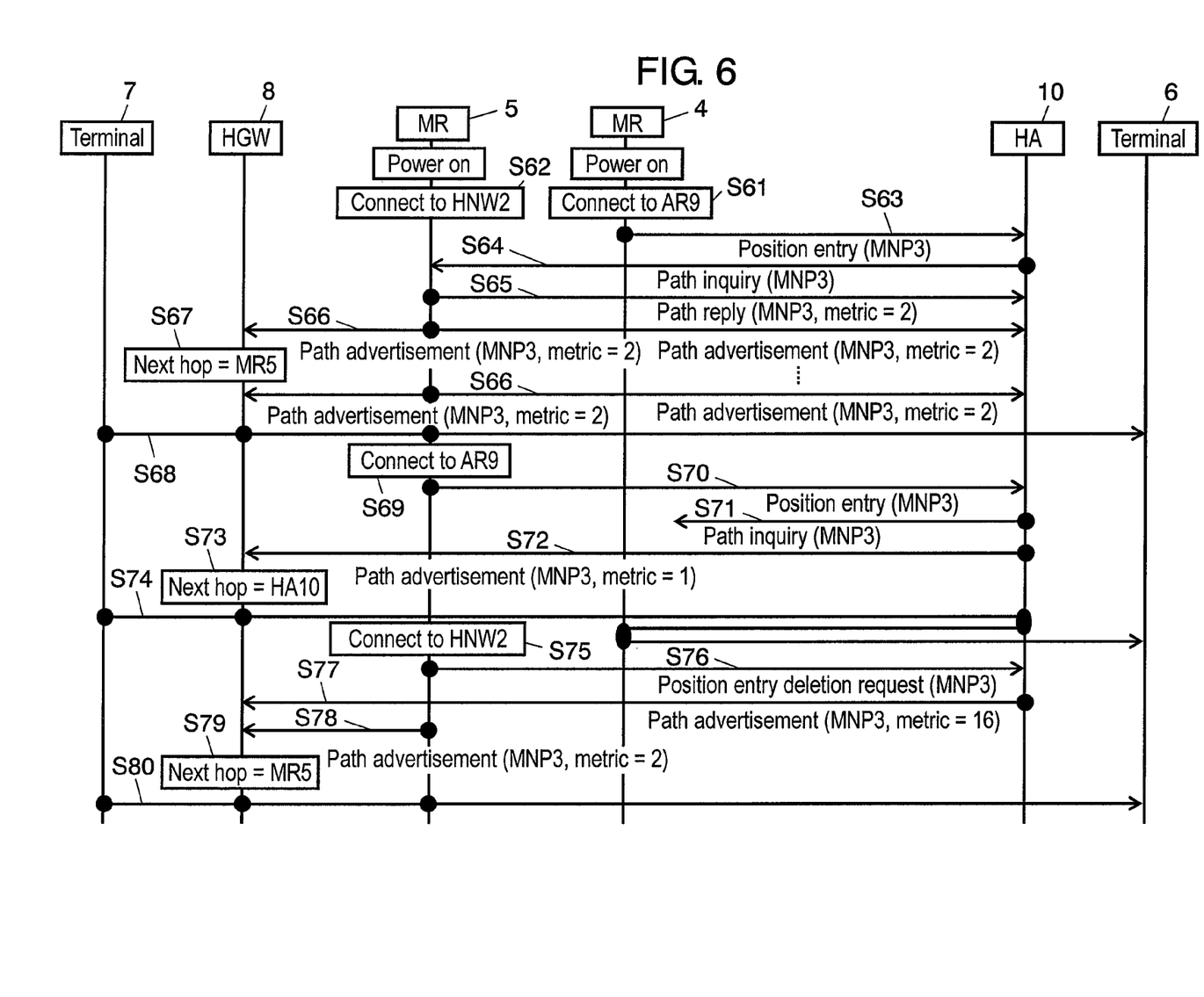
FIG. 6 illustrates a path control sequence according to the embodiment of the present invention.

FIG. 6 illustrate communication sequences in the embodiment.

In FIG. 6, after the power to mobile routers (MR) 4, 5 is turned on, mobile router 4 connects to access router (AR) 9 in an external network to perform an external network connection process (step S61). Meanwhile, mobile router 5 connects to home network (HNW) 2 to perform a home network connection process (step S62).

Next, mobile router 4 transmits a position entry request to home agent 10 (step S63), where mobile router 4 does not perform path advertisement at this moment.

When receiving the position entry request packet from mobile router 4, home agent 10 performs a position entry process and then performs multicast transmission of a path inquiry packet in home network 2 (step S64).

Next, when receiving the path inquiry packet, mobile router 5 transmits a path advertisement packet for replying to it, to home agent 10 (step S65). Since having received a reply from mobile router 5 in home network 2, home agent 10 does not transmit a path advertising packet so as not to perform substitute reception.

After connecting to home network 2, mobile router 5 performs path advertisement at certain time intervals (step S66). Responding to the path advertisement from this mobile router 5, home gateway 8 registers mobile router 5 as a next hop to mobile network 3 (MNP3), in its own path table (step S67).

Figure 7A:
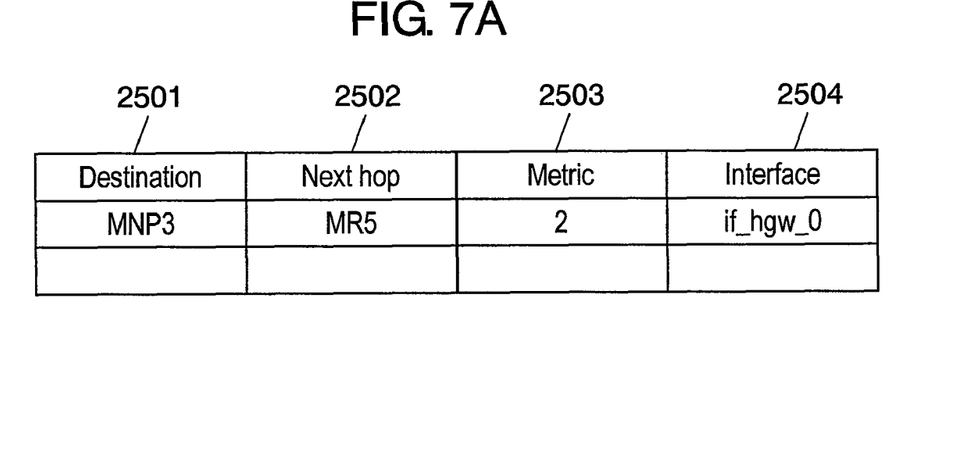
FIG. 7A shows path information managed by a home gateway according to the embodiment of the present invention.

FIG. 7A shows a path table of home gateway 8 when receiving this path advertising packet from mobile router 5. In FIG. 7A, mobile router 5 is registered as a relay destination in a case where destination 2501 is mobile network 3 (MNP3), and metric 2503 is '2', larger than the highest priority '1'. Interface 2504 is a home network interface, indicating that mobile router 5 is positioned in home network 2.

The reason for not using '1' for metric 2503 is, when home agent 10 replaces a mobile router as a relay destination in the future, to rapidly switch from the mobile router to home agent 10.

As a result that a path table has been thus set, home gateway 8 transmits a packet addressed to terminal 6 not to home agent 10 but to mobile router 5 (step S68).

As described above, if a mobile router connected to mobile network 3 connects to home network 2, home agent 10 does not perform path advertisement for corresponding mobile network 3, thereby allowing home gateway 8 to select an optimum path registered.

Next, when moving to connect to access router 9, mobile router 5 performs an external network connection process (step S69). Then, mobile router 5 transmits a position entry request packet to home agent 10 (step S70).

Next, home agent 10 performs path inquiry responding to the packet (step S71). However, mobile router 5 does not connect to home network 2 and other mobile routers are not in home network 2, thus no path reply is made after standing by for a certain period of time. Accordingly, home agent 10 starts path advertisement for informing that home agent 10 will perform substitute reception for mobile network 3 (step S72). The metric of the path advertising packet at this moment is '1'.

Figure 7B:
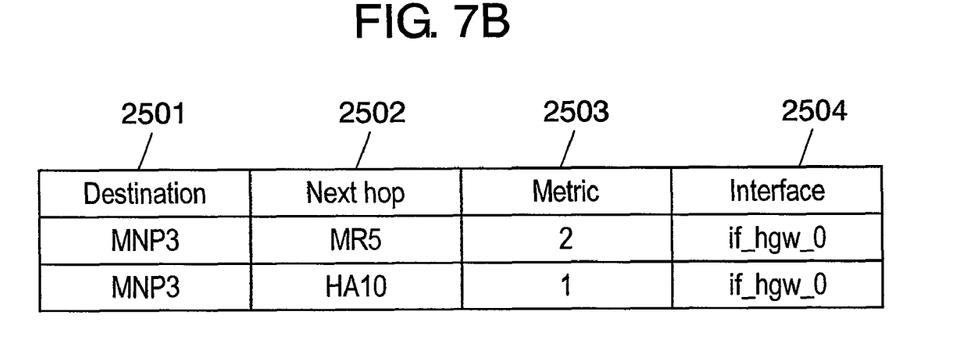
FIG. 7B shows path information managed by a home gateway according to the embodiment of the present invention.

When receiving this path advertising packet, home gateway 8 updates its own path table to that shown in FIG. 7B (step S73). That is, in FIG. 7B, a path is newly added that is addressed to mobile network 3 (MNP3) with next hop 2502 being home agent (HA) 10. When receiving a packet addressed to terminal 6, home gateway 8 transfers a packet addressed to MNP3, to home agent 10, since the metric (=1) of a path to home agent 10 is higher than metric (=2) of a path to mobile router 5 in priority (step S74).

Home gateway 8 thus selects an optimum path registered, by metric.

Next, when mobile router 5 connects to home network 2 again (step S75), mobile router 5 informs home agent 10 that access router 9 has been disconnected. For this purpose, mobile router 5 transmits a position entry deletion request to home agent 10 (step S76). Further, mobile router 5 starts transmitting a path advertising packet for advertising its own position at certain time intervals (step S78).

Meanwhile, when receiving a position entry deletion request from mobile router 5, home agent 10 multicasts a path advertising packet with a metric of '16' in order to inform of a disconnected condition of mobile router 5 (step S77).

Figure 7C:
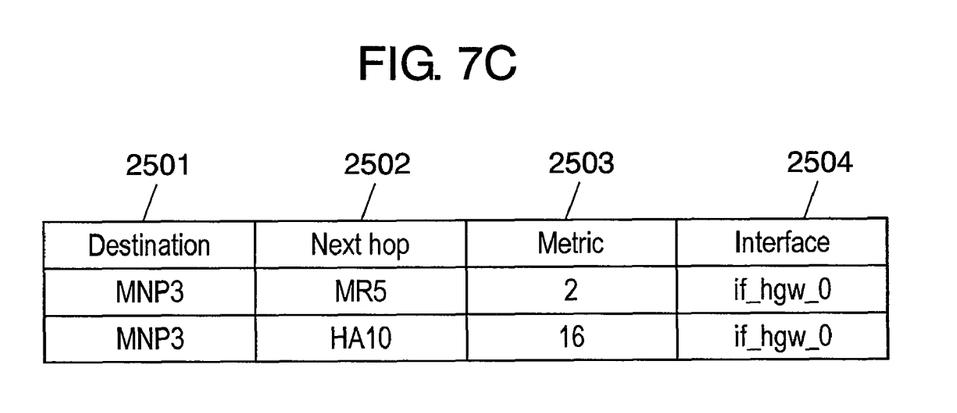
FIG. 7C shows path information managed by a home gateway according to the embodiment of the present invention.

Home gateway 8 updates its own path table to that shown in FIG. 7C with this path advertising packet received (step S79). That is, in FIG. 7C, the path addressed to mobile network 3 (MNP3) with next hop 2502 being home agent (HA) 10 has metric 2503 of '16' (communication impossible). Accordingly, home gateway 8 selects mobile router 5 as a relay destination of a packet addressed to terminal 6 to transfer the packet (step S80).

Home gateway 8 can thus select an optimum path registered as a path to a destination node, by metric.

In this embodiment, the description is made for a case where IPv6 is used, but not limited. Using IPv4 as well implements the present invention.

According to the present invention, an optimum path thus can be selected even if both a mobile router connected to a home network and that connected to an external network exist in one mobile network with plural mobile routers connected thereto. Further, even if a connection destination of a mobile router changes, the home gateway can promptly switch to an optimum path to the destination node.

INDUSTRIAL APPLICABILITY

The present invention is useful for such as a path control method in a mobile network system and suitable for a case where plural mobile routers connected to the same mobile network move between a home network and an external network.

The invention claimed is:

1. A home agent comprising:
   a receiving unit that receives a position entry request from a mobile router;
   a mobile router presence acknowledging unit that transmits a path inquiry message for inquiring whether or not an other mobile router connected to a mobile network of the mobile router is also connected to a home network of the home agent;
   an alternate path information advertising unit that transmits to the home network, an alternate path information to the mobile network, indicating a path with lowest cost, when the mobile router presence acknowledging unit acknowledges that the other mobile router is not connected to the home network; and
   an alternate path deleting unit that advertises to the home network, alternate path information indicating that the alternate path involves maximum cost, when the receiving unit receives a request for deleting the position entry from the mobile router.

2. The home agent of claim 1, wherein the alternate path information advertising unit does not transmit the alternate path information if the mobile router connected to the mobile network is connected to the home network.

* * * * *